US011391605B2

(12) United States Patent
Payraud

(10) Patent No.: US 11,391,605 B2
(45) Date of Patent: Jul. 19, 2022

(54) FASTENING DEVICE FOR HOLDING A SENSOR

(71) Applicant: Pierre Payraud, Thyez (FR)

(72) Inventor: Pierre Payraud, Thyez (FR)

(*) Notice: Subject to any disclaimer, the term of this patent is extended or adjusted under 35 U.S.C. 154(b) by 571 days.

(21) Appl. No.: 16/330,404

(22) PCT Filed: Sep. 8, 2017

(86) PCT No.: PCT/IB2017/055422
§ 371 (c)(1),
(2) Date: Mar. 5, 2019

(87) PCT Pub. No.: WO2018/047105
PCT Pub. Date: Mar. 15, 2018

(65) Prior Publication Data
US 2021/0278259 A1 Sep. 9, 2021

(30) Foreign Application Priority Data

Sep. 12, 2016 (FR) ..................... 16 58483

(51) Int. Cl.
*G01D 11/30* (2006.01)
*B08B 3/02* (2006.01)
(52) U.S. Cl.
CPC ............. *G01D 11/30* (2013.01); *B08B 3/02* (2013.01)
(58) Field of Classification Search
None
See application file for complete search history.

(56) References Cited

U.S. PATENT DOCUMENTS

| 4,784,491 | A | 11/1988 | Penney |
| 2014/0254631 | A1 | 9/2014 | Slavens |
| 2015/0177124 | A1* | 6/2015 | Tokhtuev ............... G01N 21/15 356/246 |
| 2017/0050226 | A1* | 2/2017 | Schupska ............... B08B 17/02 |

FOREIGN PATENT DOCUMENTS

| DE | 102008050902 A1 | 3/2010 | |
| DE | 102011011087 A * | 7/2012 | ............. G01D 11/30 |
| WO | 9745231 A1 | 12/1997 | |

OTHER PUBLICATIONS

DE102011011087A English translation, accessed on Nov. 2021. (Year: 2012).*

* cited by examiner

*Primary Examiner* — Eric W Golightly
*Assistant Examiner* — Arlyn I Rivera-Cordero
(74) *Attorney, Agent, or Firm* — William H. Eilberg

(57) ABSTRACT

A fastening device for holding a sensor has a cylindrical form limited by a proximal end and a distal end. The fastening device includes a tubular body extending along a median longitudinal axis (I-I) between a first end and a second end, and including a longitudinal through passage for receiving the sensor. At the second end of the tubular body there is a flared portion extending radially inwards and defining an orifice with a cross-section of smaller dimensions than the cross-section of the sensor. The fastening device also includes a device for axially immobilizing the sensor in the longitudinal through passage. The axial immobilization device is shaped so as to keep the distal end of the sensor at a longitudinal distance (E) from the flared portion. The fastening device is a device for bringing a fluid inside the tubular body and into the space between the flared portion and the distal end of the sensor.

10 Claims, 8 Drawing Sheets

FASTENING DEVICE FOR HOLDING A SENSOR

CROSS-REFERENCE TO RELATED APPLICATIONS

This application claims the benefit of international application No. PCT/IB2017/055422, filed Sep. 8, 2017, which claims the benefit of French Patent Application No. FR16 58483, filed on Sep. 12, 2016.

TECHNICAL FIELD OF THE INVENTION

The present invention relates to the field of sensors and, more specifically, relates to a fastening device for holding a sensor.

Proximity sensors are known that have a cylindrical form limited by a proximal end and a distal end. These sensors can be capacitive, inductive, optoelectronic or optical fiber sensors, for example, and most often have a circular cross-section. Such sensors are used, for example, in a machine tool or on an automated manufacturing line for detecting the presence of an object and/or for measuring the distance at which the object is located.

In order to hold one of these sensors in a fixed position relative to their environment, a fastening device, which is marketed by BALLUFF GmbH, is known that comprises:
a tubular body extending along a median longitudinal axis between a first end and a second end and comprising a longitudinal through passage intended to receive said sensor;
means for axially immobilizing the sensor in the longitudinal through passage;
a flared portion, at the second end of the tubular body, extending radially inwards and defining an orifice with a cross-section having smaller dimensions than the dimensions of the cross-section of the sensor.

The tubular body is provided, for example, with an external thread on at least part of the external surface thereof to allow it to be fastened through a wall by means of a nut and a lock nut.

When such a fastening device is used, the sensor is inserted into the longitudinal through passage of the tubular body. Once it is inserted, the distal end of the sensor comes into abutment against the radial flared portion, thus blocking the orifice, then the axial immobilization means are moved in order to axially immobilize the sensor in the longitudinal through passage. Detection is performed through the orifice defined by the radial flared portion.

The sensor can be disrupted by a polluting environment, for example, by projections of cutting oil, material swarf or filings that deposit onto the distal end of the sensor. These deposits can prevent the sensor from operating correctly. When a sensor operates incorrectly, the machine tool or automated line is immediately stopped in order to prevent an incident. A technician then needs to intervene in order to disassemble, clean and reassemble the sensor, check its operation, then restart the machine tool or automated line.

This therefore results in production stoppages that reduce productivity fairly significantly. In the absence of a technician, the machine tool or automated line sometimes can remain shut down for a significant time period.

A fastening device is known from document WO 97/45231 A1 comprising:
a tubular body extending along a median longitudinal axis between a first end and a second end and comprising a longitudinal through passage intended to receive said sensor;
means for axially immobilizing the sensor in the longitudinal through passage.

In order to limit any risks of disruption and/or malfunctioning of the sensor, document WO 97/45231 A1 makes provision for forming a continuous cylindrical protective barrier all around the detection face of the sensor using a liquid or gas flow injected into an annular chamber arranged between the sensor and the tubular body. This barrier is formed by the cylindrical axial flow of fluid exiting the tubular body in the form of a continuous ring all around the detection face of the sensor. Introducing a stop by means of a radial flared portion, with which the detection face of the sensor would make contact, would interrupt (and even remove) this barrier and would thus degrade the desired protection of the sensor. Furthermore, the cylindrical protective barrier does not fully protect the detection face of the sensor.

DISCLOSURE OF THE INVENTION

A problem proposed by the present invention is to provide a fastening device for holding a sensor that allows any disruptions of the sensor caused by a polluting environment to be reduced and even avoided, without significantly increasing the footprint of the fastening device, which generally has limited available space in the environment.

At the same time, the aim of the present invention is to provide a fastening device for holding a sensor that allows more effective protection of the sensor in a polluting environment and also allows the operation of a sensor to be restored after it has been rendered inoperative by the polluting environment.

In order to achieve these and other aims, the invention proposes a fastening device for holding a sensor having a cylindrical form limited by a proximal end and a distal end, the fastening device comprising:
a tubular body extending along a median longitudinal axis between a first end and a second end and comprising a longitudinal through passage intended to receive said sensor;
means for axially immobilizing the sensor in the longitudinal through passage;
a flared portion, at the second end of the tubular body, extending radially inwards and defining an orifice with a cross-section having smaller dimensions than the dimensions of the cross-section of the sensor; according to the invention:
the axial immobilization means are shaped so as to keep the distal end of the sensor at a predetermined minimum longitudinal distance from said flared portion, so that a space for radial conduction of fluid is formed between the flared portion and the distal end of the sensor;
the fastening device comprises means for carrying a fluid inside the tubular body and into the space for radial conduction of fluid between the flared portion and the distal end of the sensor.

The axial immobilization means themselves ensure that the distal end of the sensor is kept at a predetermined minimum longitudinal distance from said flared portion, so that the frontal distal end surface of the sensor cannot come into contact with said flared portion, leaving open a space for radial conduction of fluid that provides a conduction and diversion function when the fluid, such as air, for example, is injected between the flared portion and the distal end of the sensor: the radial flared portion directs at least some of the flow radially inwards. This part of the fluid injected into the tubular body thus, after being diverted by the radial flared portion, wipes the frontal distal end surface of the sensor before escaping through the orifice defined by the flared portion at the second end of the tubular body and left open by virtue of the axial immobilization means. This diverted flow of fluid on the distal end of the sensor better limits the risks of deposits on the frontal distal end surface of the sensor that can lead to a malfunction of the sensor and even allows any deposits to be ejected that would have formed on the distal end of the sensor, causing the sensor to malfunction.

The injection of fluid can be continuous throughout the operating duration of the machine tool or of the automated line or can be controlled automatically when a sensor malfunction is detected by the PLC managing the machine tool or automated line or even can be controlled at regular or irregular intervals throughout the operating duration of the machine tool or of the automated line.

Since the means for carrying a fluid are arranged inside the ubular body, the footprint of the fastening device is not, or is only slightly, increased.

The injected fluid also allows the sensor to be effectively cooled, and particularly the frontal distal end surface of the sensor when said surface is exposed to high heat sources through the orifice arranged in the second end of the tubular body.

Advantageously, the axial immobilization means can comprise axial stop means, comprising at least one stop face intended to receive the distal end of the sensor in abutment in order to keep the distal end of the sensor at a predetermined longitudinal distance from said flared portion.

The axial stop means limit the penetration of the sensor in the longitudinal through passage in order to prevent the distal end thereof from corning into contact with the radial flared portion. This thus prevents the distal end of the sensor from coming into abutment against the radial flared portion and obstructing the orifice defined thereby. The longitudinal distance between the flared portion and the distal end of the sensor is also prevented from being too great and preventing the flared portion from effectively fulfilling its role of diverter for diverting the flow of fluid and directing it toward the frontal distal end surface of the sensor. The space for radial conduction of fluid between the flared portion and the distal end of the sensor is thus reliably maintained for an injection of fluid that sufficiently wipes the frontal distal end surface of the sensor and subsequently escapes through the orifice.

Preferably, the axial stop means can comprise at least one projection extending longitudinally from the flared portion toward the first end. Thus, the predetermined longitudinal distance between the distal end of the sensor and the radial flared portion is easily and precisely adjusted.

Advantageously, provision can be made for:
the longitudinal through passage to comprise:
  a first section comprising first stop means shaped so as to come into abutment against the cylindrical external surface of the sensor;
  a second section, following on from the first section toward the second end, comprising a cross-section having greater dimensions than the cross-section of the sensor and thus providing a radial chamber arranged around the sensor when said sensor is engaged in the second section;
  a third section, following on from the second section toward the second end, comprising second stop means shaped so as come into abutment against the cylindrical external surface of the sensor;
  a fourth section included between said flared portion and said at least one stop face;
the means for carrying a fluid comprise:
  the radial chamber arranged in the second section;
  a radial passage arranged in the lateral wall of the tubular body and allowing a fluid to be injected into the radial chamber of the second section;
  at least one longitudinal passage allowing a fluid to pass from the second section toward the fourth section in the presence of a sensor engaged in the third section.

The fastening device is thus very compact and easy to manufacture by machining.

Preferably, the second stop means can comprise a plurality of protuberances extending radially inwards, separated from each other by a plurality of longitudinal passages allowing a fluid to pass from the second section toward the fourth section in the presence of a sensor engaged in the third section.

The protuberances allow the sensor to be radially held with limited clearance, by defining a cross-section between them having dimensions substantially equal to the dimensions of the cross-section of the sensor. Longitudinal passages are provided between the protuberances that allow fluid to be injected at a sufficient rate to properly clean the distal end of the sensor.

Advantageously, the protuberances and longitudinal passages can be easily and quickly obtained by radial milling.

In order for most, even all, of the injected fluid to be directed toward the radial flared portion in order to wipe the distal end of the sensor, provision preferably can be made for the first stop means to comprise a cylindrical lateral surface with a cross-section having dimensions substantially equal to the dimensions of the cross-section of the sensor. The first stop means thus radially hold the sensor with limited clearance in order to provide good reliability. Furthermore, this limited clearance only allows a small amount of fluid (or even no fluid) to pass between the first stop means and the sensor, and in any event less than the amount of fluid that can be passed toward the second end of the tubular body. In other words, the engagement of the sensor in the first stop means forms a sufficient obstruction of the longitudinal through passage in order for most, even all, of the injected fluid to be directed toward the second end of the tubular body and its radial flared portion.

As an alternative, it is possible to use first stop means similar to the second stop means (thus easily allowing the fluid to pass toward the first end of the tubular body), but to also use means for at least partially (even fully) obstructing the first end of the tubular body, so that most (even all) of the fluid injected into the tubular body is directed toward the second end of the tubular body in order to be subsequently directed by the radial flared portion on the distal end of the sensor.

Advantageously, the axial immobilization means can comprise an internal thread intended to engage with an external thread provided on the external surface of the sensor. The internal thread of the axial immobilization means, through its engagement with the external thread provided on the external surface of the sensor, allows reliable axial retention of the sensor in the longitudinal through passage, and with a relative seal, so that most, even ail, of the injected fluid is directed toward the second end of the tubular body and its radial flared portion.

Preferably, the flared portion can be annular. A wipe of the distal end of the sensor thus is substantially even in all the radial directions.

Advantageously, the tubular body can be provided with an external thread on at least part of the external surface thereof.

According to another aspect of the present invention, a method is proposed for cleaning and/or cooling a sensor having a cylindrical form limited by a proximal end and a distal end. Said method comprises the following steps:

a) supplying a sensor having a cylindrical form limited by a proximal end and a distal end;
b) supplying a fastening device for holding the sensor, comprising:
   a tubular body extending along a median longitudinal axis between a first end and a second end and comprising a longitudinal through passage intended to receive said sensor;
   means for axially immobilizing the sensor in the longitudinal through passage;
   a flared portion, at the second end of the tubular body, extending radially inwards and defining an orifice with a cross-section having smaller dimensions than the dimensions of the cross-section of the sensor;
   means for carrying a fluid inside the tubular body and into the vicinity of the flared portion;
c) inserting the sensor into the longitudinal through passage of the tubular body while providing a non-zero longitudinal distance between the distal end of the sensor and said flared portion, so that at least some of a fluid circulating through the tubular body via the means for carrying a fluid can circulate in a space for radial conduction of fluid thus provided between the flared portion and the distal end of the sensor;
d) injecting a fluid inside the tubular body so that the fluid circulates in the space for radial conduction of fluid provided between the flared portion and the distal end of the sensor and is diverted in order to wipe the frontal distal end surface of the sensor.

In such a method, a fastening device can be used that is devoid of axial immobilization means shaped so as to hold the distal end of the sensor at a predetermined minimum longitudinal distance from said flared portion (as in the prior art), but nevertheless comprising means for carrying a fluid inside the tubular body and into the vicinity of the flared portion. It must be noted that such a fastening device can be patent protected as such, particularly by means of a divisional application.

BRIEF DESCRIPTION OF THE DRAWINGS

Further aims, features and advantages of the present invention will become apparent from the following description of particular embodiments, which are provided with reference to the accompanying figures, in which.

DESCRIPTION OF PREFERRED EMBODIMENTS

Figure 1:
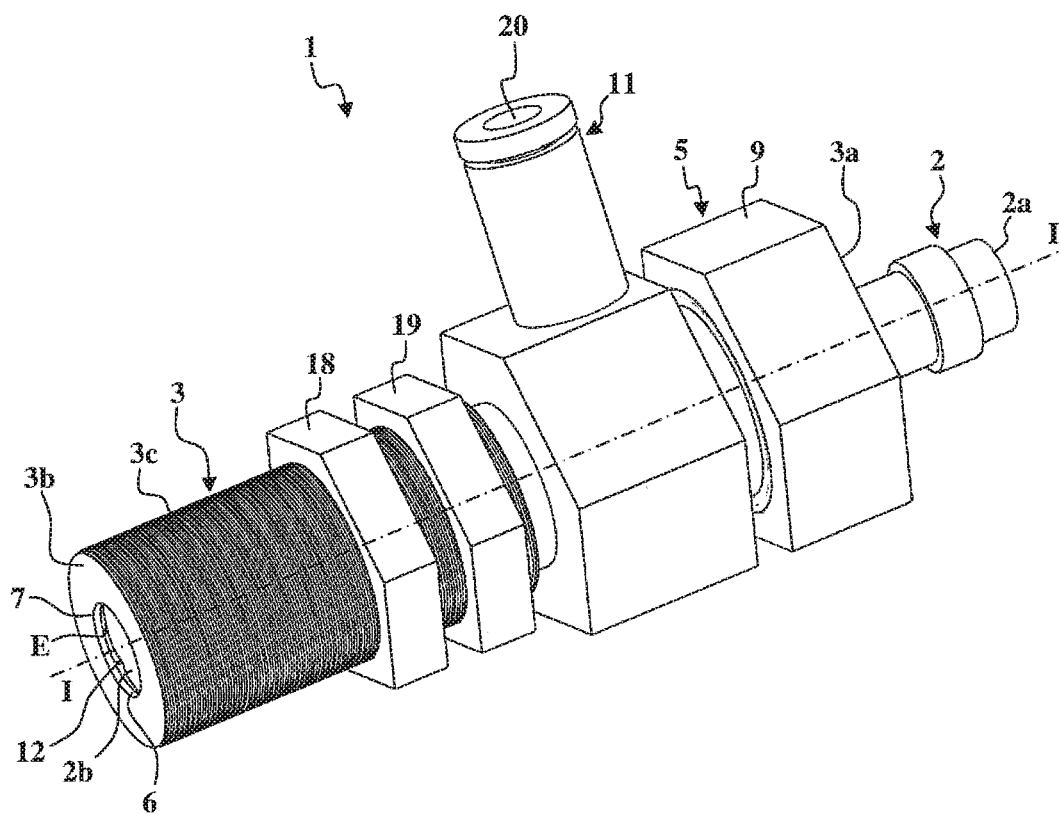
FIG. 1 is a perspective view of a first embodiment of a fastening device according to the present invention, with a sensor inserted into the through passage of the tubular body.

FIGS. 1 to 6 show a first embodiment of a fastening device 1 according to the invention for holding a sensor 2. The sensor 2 has a cylindrical form limited by a proximal end 2a and a distal end 2b with a frontal end surface 20b.

The fastening device 1 comprises:

a tubular body 3 extending along a median longitudinal axis I-I between a first end 3a and a second end 3b and comprising a longitudinal through passage 4 intended to receive said sensor 2;

means 5 for axially immobilizing the sensor 2 in the longitudinal through passage 4.

The longitudinal axis I-I is median in that it is substantially located at the center of the longitudinal through passage 4.

The tubular body 3 comprises an external thread 3c so as to engage with a nut 18 and a lock nut 19 in order to be assembled through a wall of a machine tool or an automated line.

At the second end 3b of the tubular body 3, a flared portion 6 extends radially inwards (in other words by moving closer to the median longitudinal axis I-I) and defines an orifice 7 with a cross-section having smaller dimensions than the dimensions of the cross-section of the sensor 2. In this case, the orifice 7 has a diameter D7 below the diameter D2 of the distal end 2b of the sensor 2.

The axial immobilization means 5 are shaped so as to keep the distal end 2b of the sensor 2 at a predetermined minimum (non-zero) longitudinal distance E from the flared portion 6. The distal end 2b of the sensor 2 thus cannot come into abutment against the flared portion 6, which thus can reliably provide an injected fluid diversion function, as will be described hereafter.

The flared portion 6 is annular in order for the injected fluid to provide a substantially even wipe, in all the radial directions, of the distal end 2b (and of its frontal end surface 20b) of the sensor 2.

In the embodiment of FIGS. 1 to 6, the axial immobilization means 5 comprise a resiliently deformable conical ring 8 intended to be axially pressed between a nut 9 engaging with a conical bearing surface 10. The engagement of the nut 9 with the conical bearing surface 10 allows the conical ring 8 to be deformed inwards (in other words by moving closer to the median longitudinal axis I-I) in order to tighten said ring against the cylindrical external surface of the sensor 2 and to axially immobilize said sensor along the median longitudinal axis H.

Figure 2:
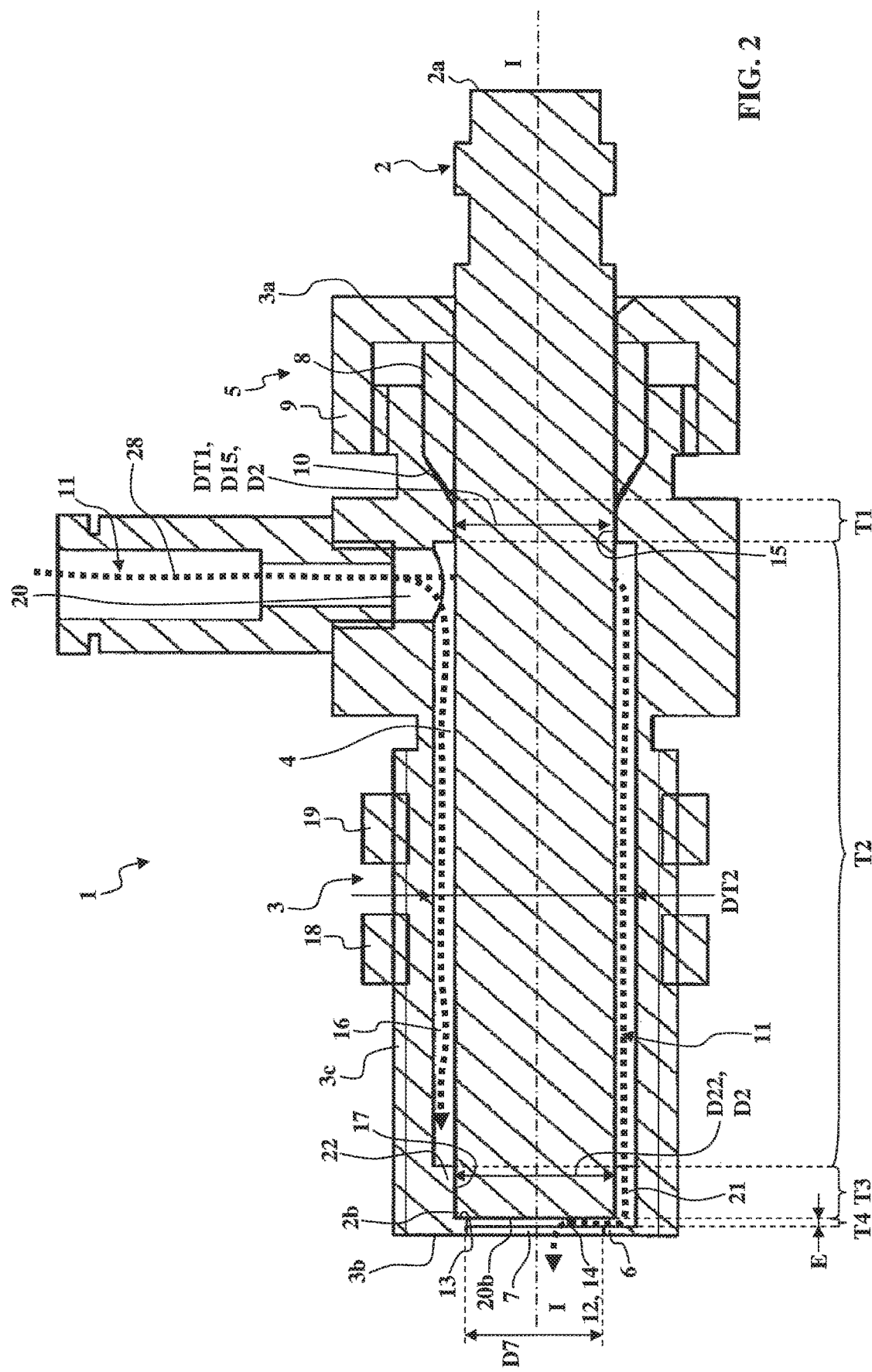
FIG. 2 is a longitudinal section view of the fastening device of FIG. 1.

FIG. 2 more specifically shows that the fastening device 1 comprises means for carrying a fluid 11 inside the tubular body 3 and into the immediate vicinity (upstream) or the flared portion 6. The means for carrying fluid 11 more specifically allow the fluid to be carried into the space E between the flared portion 6 and the distal end 2*b* of the sensor 2 when said sensor is inserted into the longitudinal through passage 4.

Still with reference to FIG. 2, it can be seen that the axial immobilization means 5 also comprise axial stop means 12 comprising at least one stop face 13 intended to receive the distal end 2*b* of the sensor 2 in abutment in order to keep the distal end 2*b* of the sensor 2 at a predetermined longitudinal distance E from said flared portion 6.

Figure 3:
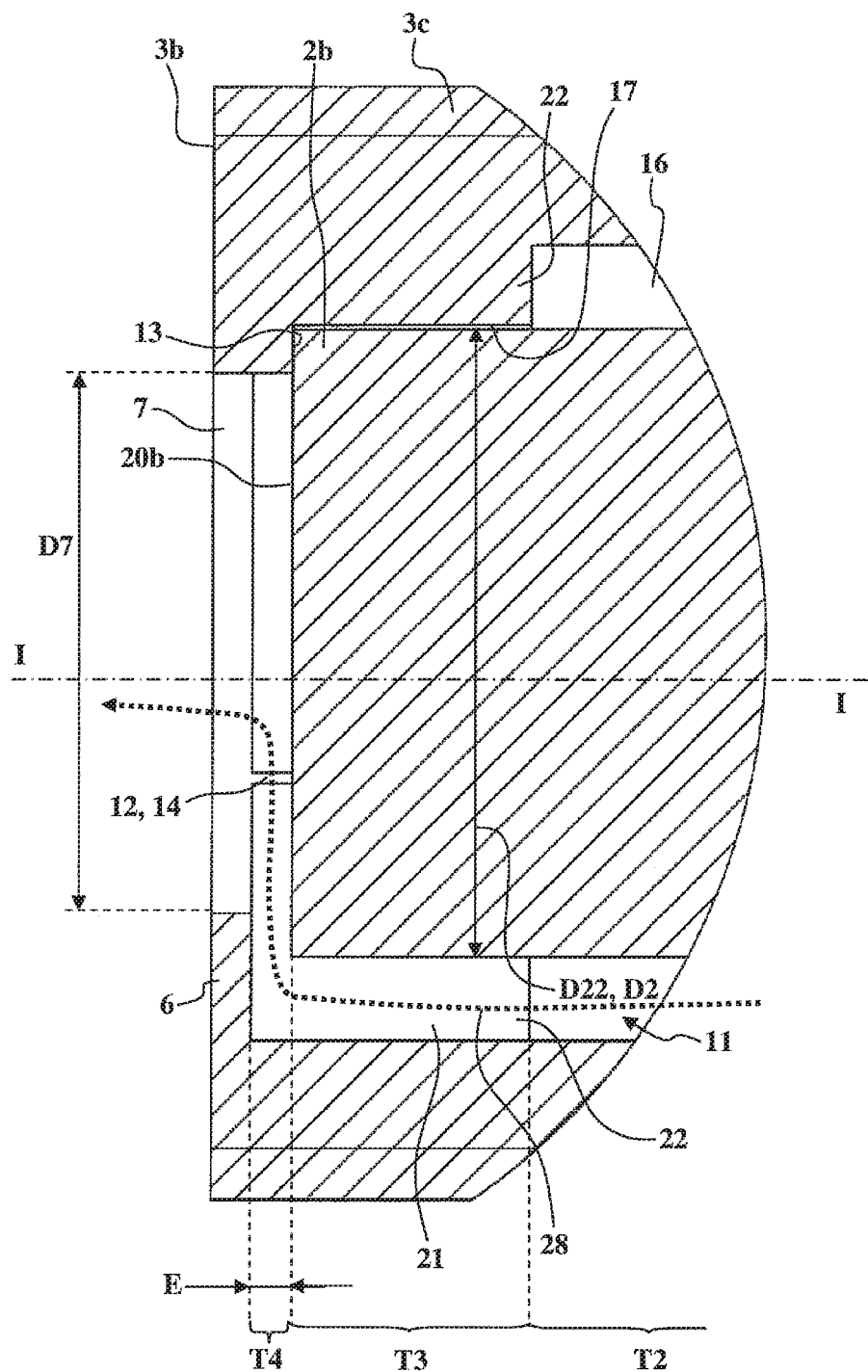
FIG. 3 is a detailed view of FIG. 2.
Figure 5:
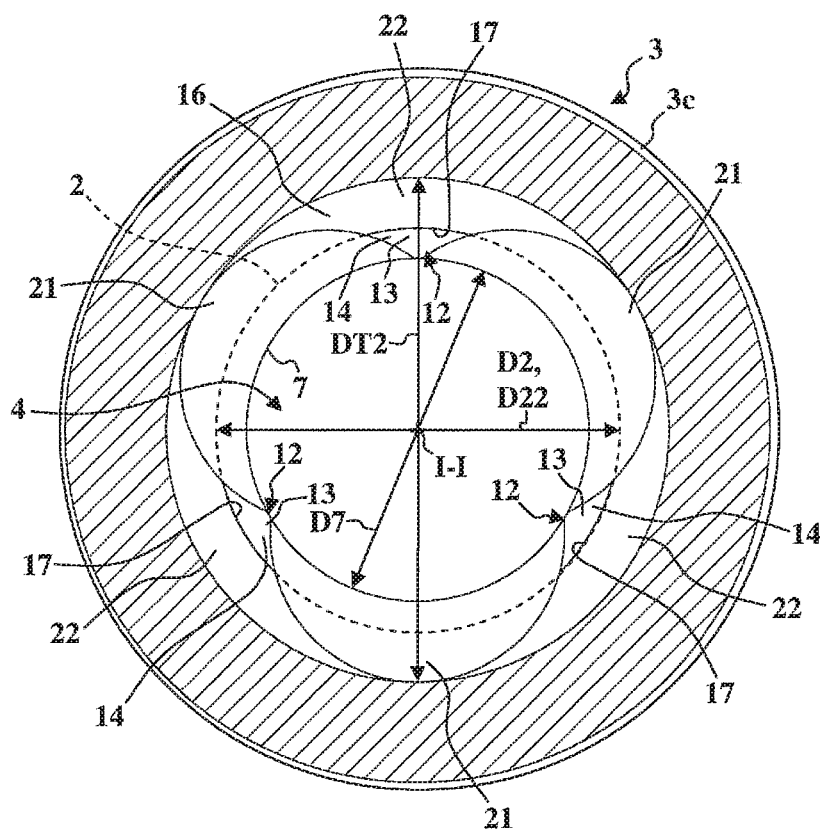
FIG. 5 is a transverse section view of the tubular body of the fastening device of FIG. 1.
Figure 6:
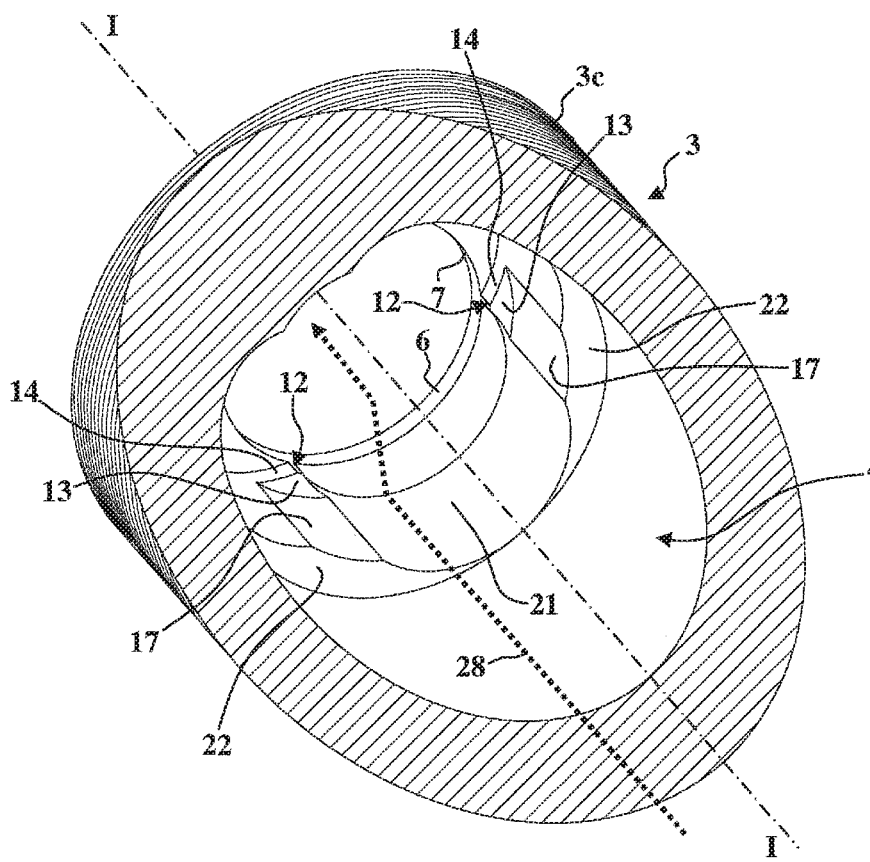
FIG. 6 is a perspective view of an oblique transverse section of the tubular body of the fastening device of FIG. 1.

In this case, there are three stop faces 13 distributed at 120°, as will be better understood with reference to FIGS. 3, 5 and 6. These stop faces 13 are borne by projections 14 extending longitudinally from the flared portion 6 toward the first end 3*a* (or at a distance from the second end 3*b*) of the tubular body 3.

Figure 4:
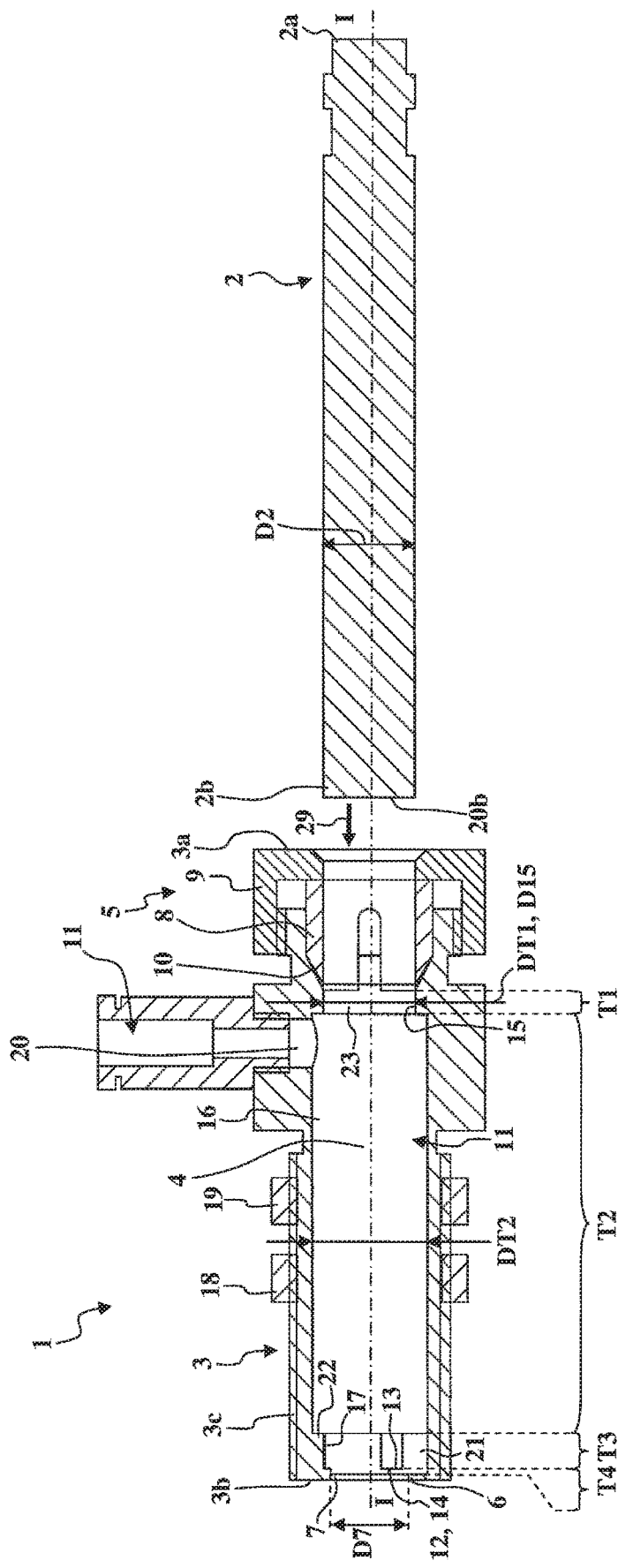
FIG. 4 is a longitudinal section view of the fastening device of FIG. 1, with the sensor outside the through passage of the tubular body.

FIGS. 2 to 4 more specifically show that the longitudinal through passage 4 comprises:
- a first section T1 comprising first stop means 15 shaped so as to come into abutment against the cylindrical external surface of the sensor 2;
- a second section T2, following on from the first section T1 toward the second end 3*b*, comprising a cross-section having greater dimensions (diameter D12) than the dimensions of the cross-section (diameter D2) of the sensor 2 and thus providing a radial chamber 16 arranged around the sensor 2 when said sensor is engaged in the second section T2;
- a third section T3, following on from the second section T2 toward the second end 3*b*, comprising second stop means 17 shaped so as come into abutment against the cylindrical external surface of the sensor 2;
- a fourth section T4 included between said flared portion 6 and said at least one stop face 13.

Still with reference to FIGS. 2 to 4, it can be seen that the means for carrying a fluid 11 comprise:
- the radial chamber 16 arranged in the second section T2;
- a radial passage 20 arranged in the lateral wall of the tubular body 3 and allowing a fluid (liquid or gas) to be injected into the radial chamber 16 of the second section T2;
- at least one longitudinal passage 21 allowing a fluid to pass from the second section T2 toward the fourth section T4 in the presence of a sensor 2 engaged in the third section T3 (see FIG. 3).

Again, there are actually three longitudinal passages 21 distributed at 120°, as is more specifically shown in FIGS. 5 and 6. In FIG. 5, the dashed line circle schematically shows the sensor 2 when it is engaged in the third section T3.

Producing the radial chamber 16 by means of a bore with a diameter DT2 greater than the diameter D2 of the sensor 2 is only one of the possibilities and is not limiting. For example, by way of an alternative, a radial chamber 16 can be provided comprising one or more longitudinal groove(s) arranged in the cylindrical lateral wall of a bore, in the second section, with a diameter substantially equal to the diameter D2 of the sensor 2.

Still with reference to FIGS. 5 and 6, it can be seen that the second stop means 17 comprise three protuberances 22 extending radially inwards (in other words by moving closer to the median longitudinal axis I-I), separated from each other by a plurality of longitudinal passages 21 allowing a fluid to pass from the second section T2 toward the fourth section T4 in the presence of a sensor 2 engaged in the third section T3. The three protuberances 22 together define a housing with a diameter D22 substantially equal to the diameter D2 of the sensor 2.

The protuberances 22 and longitudinal passages 21 are obtained by radial milling, i.e. by removing material in a tooling movement at a distance from the median longitudinal axis I-I.

The first stop means 15 for their part comprise a cylindrical lateral surface 23 with a cross-section having dimensions (diameter D15 or DT1) substantially equal to the dimensions (diameter D2) of the cross-section of the sensor 2.

The operation of the first embodiment of a fastening device 1 will now be described in further detail with reference to FIGS. 2 and 4.

When it is assembled in the fastening device 1, the sensor 2 is inserted, in the direction of the median longitudinal axis I-I, into the longitudinal through passage 4 (arrow 29 in FIG. 4). The insertion of the sensor 2 is stopped by the distal end 2*b* of the sensor 2 coming into abutment against the stop faces 13 (FIG. 2). A minimum non-zero predetermined longitudinal distance E (i.e. along the longitudinal axis I-I) is thus maintained between the distal end 2*b* and the radial flared portion 6, allowing the injected fluid to be discharged at a satisfactory rate. The nut 9 is then moved in order to axially immobilize the sensor 2 by engaging with the conical ring 8 and the conical bearing 10.

If necessary, a longitudinal distance greater than the minimum predetermined longitudinal distance E defined by the axial stop means 12 can be provided by moving the axial immobilization means 5 (conical ring 8, nut 9 and conical bearing surface 10) before the distal end 2*b* of the sensor 2 comes into contact with the stop faces 13. Nevertheless, the distal end 2*b* of the sensor 2 must be close enough to the flared portion 6 for said portion to effectively fulfill its role of diverting toward the frontal end surface 20*b*.

During the operation of the machine tool or of the automated line, a fluid is injected into the tubular body 3 through the radial passage 20. Its route is shown by the dashed line, reference sign 28. Since the first end 3*a* is obstructed in a practically sealed manner by the fact that the sensor 2 is engaged in the first stop means 15, the fluid (liquid or gas) then enters the radial chamber 16 and moves in the longitudinal direction I-I toward the second end 3*b* of the tubular body 3 over the entire length of the second section 12.

Once it has reached the distal end 2*b* of the sensor 2, the injected fluid enters the three longitudinal passages 21 and thus passes through the third section T3 in order to reach the space for radial conduction of fluid axially included in the median longitudinal axis I-I between the flared portion 6 and the distal end 2*b* of the sensor 2 (corresponding to the fourth section T4), This space for radial conduction of fluid is reliably maintained by virtue of the axial immobilization means 5.

The fluid is then radially diverted inwards (in other words by moving closer to the median longitudinal axis I-I) by the radial flared portion 6 acting as a diverter in order to cause the flow to wipe the frontal distal end surface 20*b* of the sensor 2. The fluid subsequently escapes through the orifice 7.

The frontal distal end surface 20*b* is thus wiped by the flow of the injected fluid, which allows the clogging-up thereof to be better avoided, and even for it to be cleaned after any clogging-up. The flow of fluid also allows the sensor 2 to be effectively cooled, and particularly its frontal distal end surface 20*b* when said surface is exposed to high heat sources through the orifice 7.

The injection of fluid can be continuous throughout the operating duration of the machine tool or of the automated line or can be controlled automatically when a sensor 2 malfunction is detected by the PLC managing the machine tool or automated line or even can be controlled at regular intervals throughout the operating duration of the machine tool or of the automated line (preventive cleaning and/or cooling). Controlling at regular intervals can be especially contemplated with the device according to the present invention since the diversion of the fluid by the flared portion 6 allows not only the risks of clogging-up of the frontal distal end surface 20b to be better limited, but also allows it to be cleaned after any clogging-up.

Figure 7:
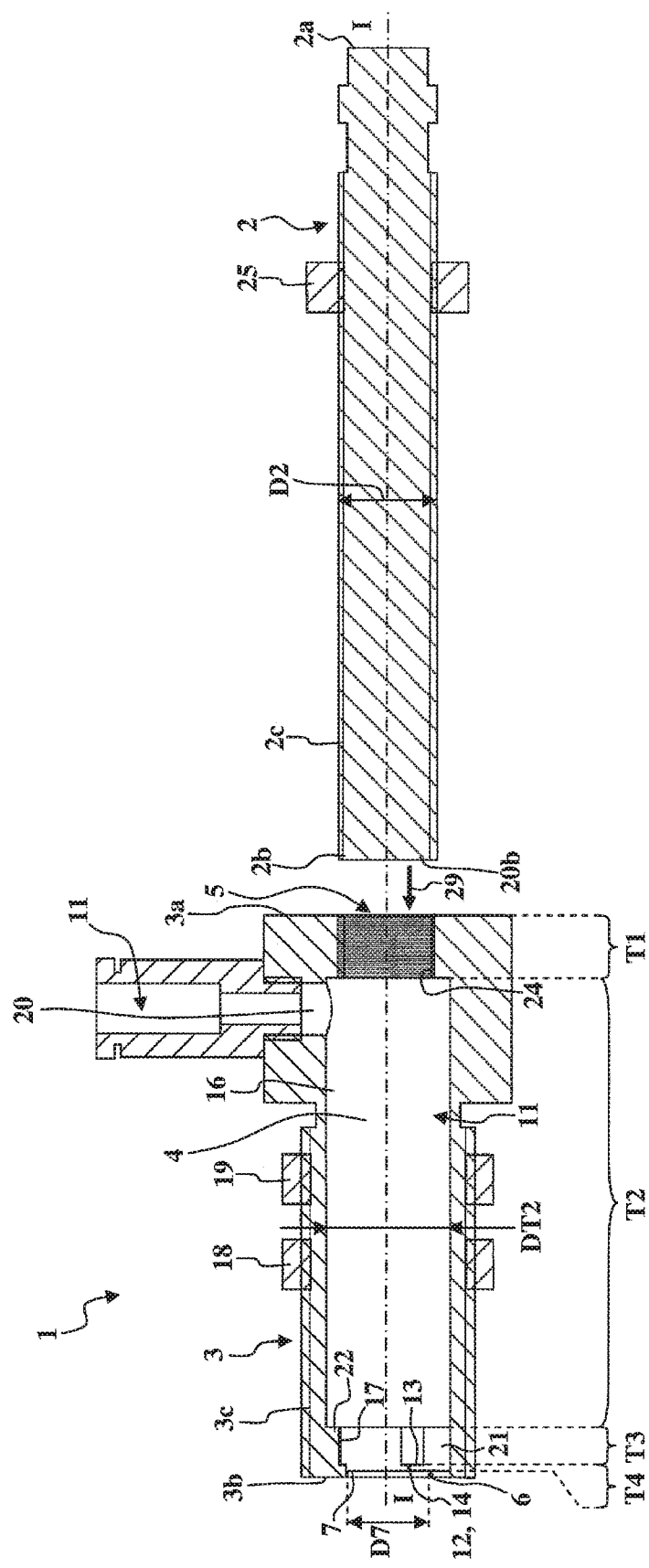
FIG. 7 is a longitudinal section view of a second embodiment of a fastening device according to the present invention, with a sensor outside the through passage of the tubular body.

The second embodiment of a fastening device 1 shown in FIG. 7 is very similar to the first embodiment of a fastening device 1 shown in FIGS. 1 to 6. The reference signs used for the description of the first embodiment thus denote the same elements as in the second embodiment.

The difference between the second embodiment and the first embodiment is that the axial immobilization means 5 comprise, in the first section T1, an internal thread 24 intended to engage with an external thread 2c provided on the external surface of the sensor 2.

In this second embodiment, a nut 25 engaging with the external thread 2c also can be used to limit the screwed penetration of the sensor 2 into the tubular body 3 in order to keep the distal end 2b of the sensor 2 at a predetermined longitudinal distance from said flared portion 6. The nut 25 thus can be used when the stop faces 13 define an excessively short minimum non-zero predetermined longitudinal distance from the flared portion 6 (or when it is preferable for a greater distance to be provided between the distal end 2b of the sensor 2 and the flared portion 6 than that which is provided by the stop faces 13).

As in the first embodiment, the second embodiment of a fastening device 1 comprises an external thread 3c of the tubular body 3 so as to engage with a nut 18 and a lock nut 19 so that it can be assembled through a wall of a machine tool or automated line.

Figure 8:
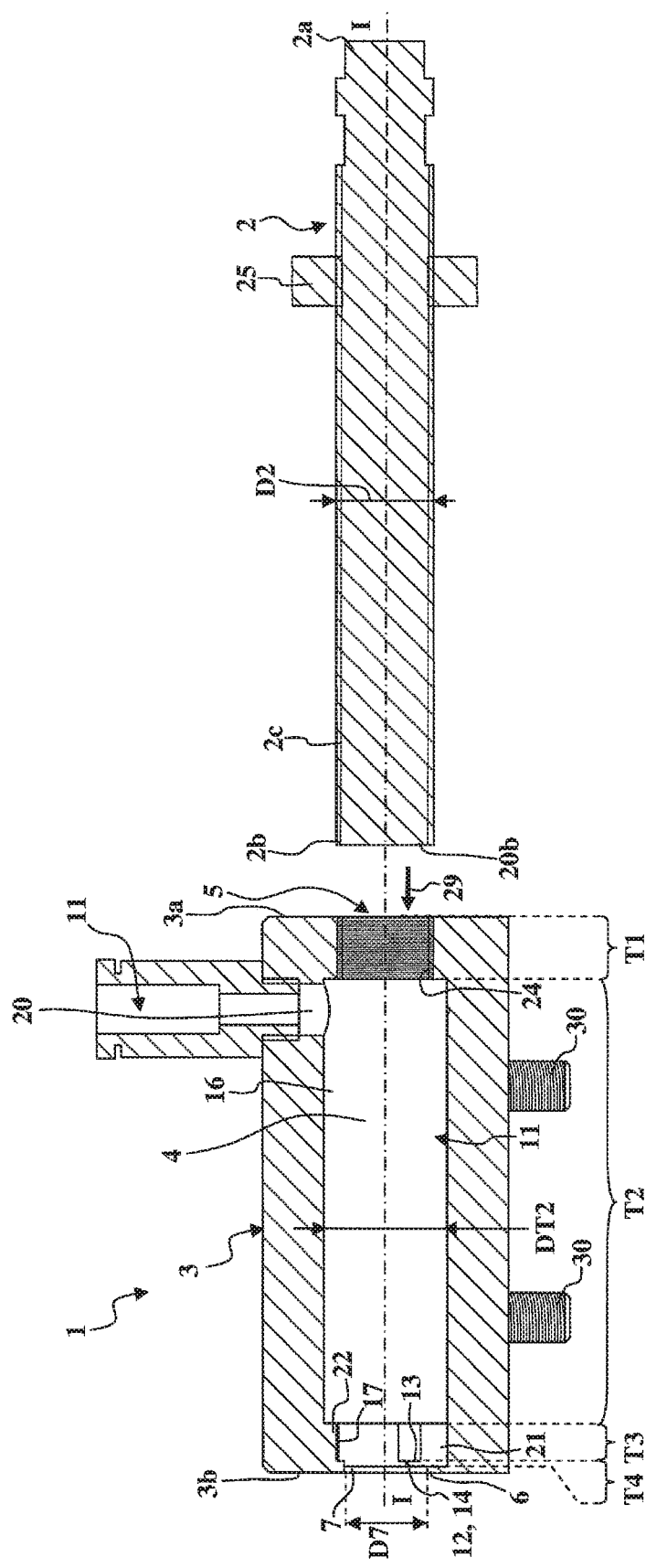
FIG. 8 is a longitudinal section view of a third embodiment of the fastening device according to the present invention, with a sensor outside the through passage of the tubular body.
Figure 9:
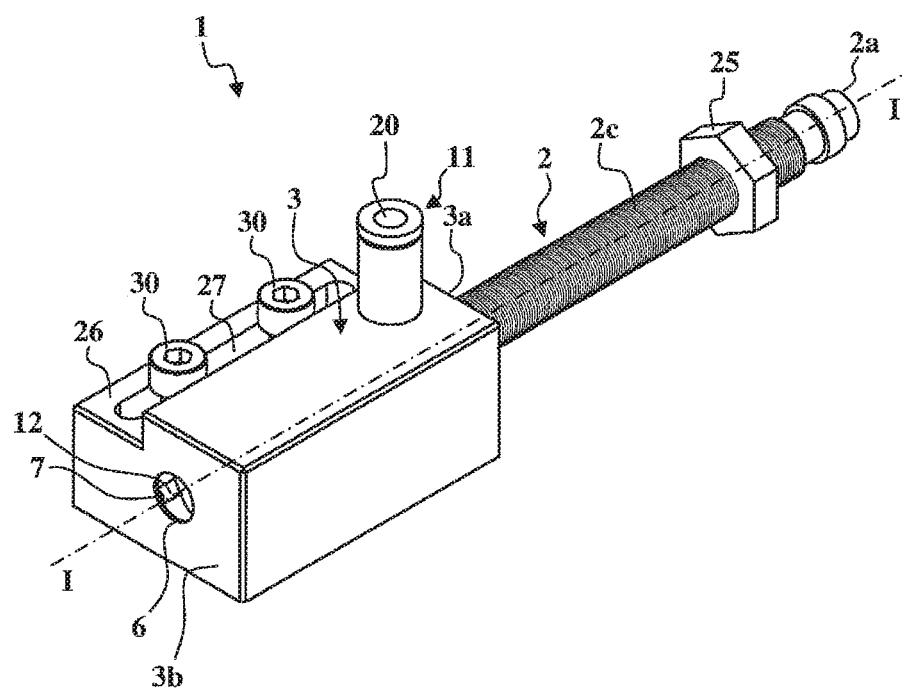
FIG. 9 is a perspective view of the fastening device of FIG. 8.

The third embodiment of a fastening device 1 shown in FIGS. 8 and 9 is also very similar to the first and second embodiments of a fastening device 1 shown in FIGS. 1 to 6 and 7. The reference signs used for the description of the third embodiment thus denote the same elements as in the first and second embodiments.

In the third embodiment, instead of an external thread 3c provided on the tubular body 3 in order for it to be fastened on a machine tool or automated line, the tubular body 3 comprises a radial flared portion 26, in which an oblong hole 27 is arranged that is intended to be traversed by one or more screws 30 intended to be screwed into the machine tool or automated line.

It must be noted that the tubular body 3 of the third embodiment of a fastening device 1 alternatively can comprise axial immobilization means 5 similar to those used in the first embodiment (with the conical ring 8, the nut 9 and the conical bearing surface 10) in order to receive sensors 2 without an external thread 2c on the external surface thereof.

The operation of the second and third embodiments of a fastening device 1 is very similar to that of the first embodiment.

One difference is that the penetration of the sensor 2 can be stopped before the distal end 2b comes into abutment against the stop faces 13 by the nut 25 coming into abutment against the first end 3a of the tubular body 3 (in the event that the minimum non-zero predetermined longitudinal distance E defined by the stop faces 13 is considered to be insufficient to allow a sufficient flow of fluid).

In the second and third embodiments, the first end 3a of the tubular body 3 is obstructed in a practically sealed manner by the fact that the sensor 2 is screwed into the internal thread 24 of the axial immobilization means 5, so that the fluid (liquid or gas) entering the radial chamber 16 also moves in the longitudinal direction H toward the second end 3b of the tubular body 3 over the entire length of the second section T2.

In all the uses for cleaning and/or cooling the sensor 2, the following steps are followed:

a) supplying a sensor 2 having a cylindrical form limited by a proximal end 2a and a distal end 2b;

b) supplying a fastening device 1 for holding the sensor 2, comprising:
- a tubular body 3 extending along a median longitudinal axis H between a first end 3a and a second end 3b and comprising a longitudinal through passage 4 intended to receive said sensor 2;
- means 5 for axially immobilizing the sensor 2 in the longitudinal through passage 4;
- a flared portion 6, at the second end 3b of the tubular body 3, extending radially inwards and defining an orifice 7 with a cross-section having smaller dimensions than the dimensions of the cross-section of the sensor 2;
- means for carrying a fluid 11 inside the tubular body 3 and into the vicinity of the flared portion 6;

c) inserting the sensor 2 into the longitudinal through passage 4 of the tubular body 3 while providing a non-zero longitudinal distance between the distal end 2b of the sensor 2 and said flared portion 6, so that at least some of a fluid injected into the tubular body 3 can circulate in a space for radial conduction of fluid thus provided between the flared is portion 6 and the distal end 2b of the sensor 2;

d) injecting a fluid inside the tubular body 3 so that the fluid circulates in the space for radial conduction of fluid provided between the flared portion 6 and the distal end 2b of the sensor 2 and is diverted in order to wipe the frontal distal end surface 20b of the sensor 2.

When the fastening device 1 is, as in the prior art, devoid of axial immobilization means 5 shaped so as to hold the distal end 2b of the sensor 2 at a predetermined minimum longitudinal distance E from said flared portion 6, said non-zero longitudinal distance between the distal end 2b of the sensor 2 and said flared portion 6 can be provided by not pushing the sensor 2 until it comes into contact with the flared portion 6.

The present invention is not limited to the embodiments that have been explicitly described, but it includes the various variations and generalizations contained within the scope of the claims provided hereafter.

The invention claimed is:

1. A process of use of a fastening device for holding a sensor, for cleaning and/or cooling a sensor having a cylindrical form limited by a proximal end and a distal end, said process comprising the following steps:
   a) supplying a sensor having a cylindrical form limited by a proximal end and a distal end;
   b) supplying a fastening device comprising:
   - a tubular body extending along a median longitudinal axis (I-I) between a first end and a second end and comprising a longitudinal through passage intended to receive said sensor;
   - means for axially immobilizing the sensor in the longitudinal through passage;
   - a flared portion, at the second end of the tubular body, extending radially inwards and defining an orifice with a cross-section having smaller dimensions than the dimensions of the cross-section of the sensor, wherein:

the means for axially immobilizing the sensor is shaped so as to keep the distal end of the sensor at a predetermined minimum longitudinal distance (E) from said flared portion, so that a space for radial conduction of fluid is formed between the flared portion and the distal end of the sensor;

the fastening device comprises means for carrying a fluid inside the tubular body and into the radial conduction space between the flared portion and the distal end of the sensor, and wherein the means for axially immobilizing the sensor comprises axial stop means, comprising at least one stop face intended to receive the distal end of the sensor in abutment in order to keep the distal end of the sensor at the predetermined minimum longitudinal distance (E) from said flared portion, c) inserting the sensor into the longitudinal through passage of the tubular body while providing a non-zero longitudinal distance (E) between the distal end of the sensor and said flared portion, so that at least some of a fluid circulating through the tubular body via the means for carrying a fluid can circulate in a space for radial conduction of fluid thus provided between the flared portion and the distal end of the sensor;

d) injecting a fluid inside the tubular body so that the fluid circulates in the space for radial conduction of fluid provided between the flared portion and the distal end of the sensor and is diverted in order to wipe the frontal distal end surface of the sensor.

2. A fastening device for holding a sensor having a cylindrical form limited by a proximal end and a distal end, the fastening device comprising:

a tubular body extending along a median longitudinal axis (I-I) between a first end and a second end and comprising a longitudinal through passage intended to receive said sensor;

means for axially immobilizing the sensor in the longitudinal through passage;

a flared portion, at the second end of the tubular body, extending radially inwards and defining an orifice with a cross-section having smaller dimensions than the dimensions of the cross-section of the sensor, wherein:

the means for axially immobilizing the sensor is shaped so as to keep the distal end of the sensor at a predetermined minimum longitudinal distance (E) from said flared portion, so that a space for radial conduction of fluid is formed between the flared portion and the distal end of the sensor;

the fastening device comprises means for carrying a fluid inside the tubular body and into the radial conduction space between the flared portion and the distal end of the sensor, and wherein the means for axially immobilizing the sensor comprises axial stop means, comprising at least one stop face intended to receive the distal end of the sensor in abutment in order to keep the distal end of the sensor at the predetermined minimum longitudinal distance (E) from said flared portion.

3. The fastening device as claimed in claim 2, wherein the axial stop means comprise at least one projection extending longitudinally from the flared portion toward the first end.

4. The fastening device as claimed in claim 2, wherein the means for axially immobilizing the sensor comprises an internal thread intended to engage with an external thread provided on the external surface of the sensor.

5. The fastening device as claimed in claim 2, wherein the flared portion is annular.

6. The fastening device as claimed in claim 2, wherein the tubular body is provided with an external thread on at least part of the external surface thereof.

7. The fastening device as claimed in claim 2, wherein:

the longitudinal through passage comprises:

a first section (T1) comprising first stop means shaped so as to come into abutment against the cylindrical external surface of the sensor;

a second section (T2), following on from the first section (T1) toward the second end, comprising a cross-section having greater dimensions than the cross-section of the sensor and thus providing a radial chamber arranged around the sensor when said sensor is engaged in the second section (T2);

a third section (T3), following on from the second section (T2) toward the second end, comprising second stop means shaped so as come into abutment against the cylindrical external surface of the sensor;

a fourth section (T4) included between said flared portion and said at least one stop face;

the means for carrying a fluid comprise:

the radial chamber arranged in the second section (T2);

a radial passage arranged in the lateral wall of the tubular body and allowing a fluid to be injected into the radial chamber of the second section (T2);

at least one longitudinal passage allowing a fluid to pass from the second section (T2) toward the fourth section (T4) in the presence of a sensor engaged in the third section (T3).

8. The fastening device as claimed in claim 7, wherein the first stop means comprise a cylindrical lateral surface with a cross-section having dimensions substantially equal to the dimensions of the cross-section of the sensor.

9. The fastening device as claimed in claim 7, wherein the second stop means comprise a plurality of protuberances extending radially inwards, separated from each other by a plurality of longitudinal passages allowing a fluid to pass from the second section (T2) toward the fourth section (T4) in the presence of a sensor engaged in the third section (T3).

10. The fastening device as claimed in claim 9, wherein the protuberances and longitudinal passages are obtained by radial milling.

* * * * *